United States Patent [19]
Entrekin et al.

[11] Patent Number: 6,126,598
[45] Date of Patent: Oct. 3, 2000

[54] ULTRASONIC DIAGNOSTIC IMAGING SYSTEM WITH ADAPTIVE SPATIAL COMPOUNDING

[75] Inventors: Robert R. Entrekin, Kirkland; James R. Jago, Seattle; Daniel C. Schmiesing, Granite Falls; Brent S. Robinson, Kirkland, all of Wash.

[73] Assignee: ATL Ultrasound, Inc., Bothell, Wash.

[21] Appl. No.: 09/335,158

[22] Filed: Jun. 17, 1999

Related U.S. Application Data

[60] Provisional application No. 60/102,923, Oct. 1, 1998.

[51] Int. Cl.$^7$ .................................................... A61B 8/00

[52] U.S. Cl. ...................................................... 600/437

[58] Field of Search ................................... 600/437, 442, 600/444, 454–456; 73/625–626

[56] References Cited

U.S. PATENT DOCUMENTS

| | | |
|---|---|---|
| 4,070,905 | 1/1978 | Kossoff . |
| 4,159,462 | 6/1979 | Rocha et al. . |
| 4,649,927 | 3/1987 | Fehr et al. . |
| 4,751,846 | 6/1988 | Dousse .................................. 600/443 |
| 5,072,734 | 12/1991 | Takeuchi . |
| 5,566,674 | 10/1996 | Weng . |
| 5,575,286 | 11/1996 | Weng et al. . |
| 5,623,929 | 4/1997 | Weng . |
| 5,653,235 | 8/1997 | Teo . |
| 5,655,535 | 8/1997 | Teo et al. . |
| 5,782,766 | 7/1998 | Weng et al. . |
| 5,908,390 | 6/1999 | Matsushima . |

OTHER PUBLICATIONS

Moskalik A. et al., "Registration of Three–Dimensional Compound Ultrasound Scans of the Breast for Refraction and Motion Correction," Ultrasound in Medicine and Biology, U.S., New York, NY, vol. 21, No. 6, pp. 769–778.

O'Donnell et al., "Optimum Displacement for Compound Image Generation in Medical Ultrasound," IEEE Trans on Ultrasonics, Ferroelectrics and Frequency Control, vol. 35, No. 4, Jul. 1988, pp. 470–476.

Feigenbaum, Echocardiography, Lea & Febiger, 1976 at pp. 32–34, Philadelphia, PA.

Carpenter et al., Technical Note—A Multimode Real Time Scanner, Ultrsound in Med. & Biol., vol. 6, pp. 279–284, Pergamon Press Ltd. 1980, Great Britain.

Berson et al., Compound Scanning With a Electrically Steered Beam, Ultrasonic Imaging 3, pp. 303–308, Academic Press, Inc. 1981.

Shattuck et al., Compound Scanning With a Phased Array, Ultrasonic Imaging 4, pp. 93–107, Academic Press, Inc. 1982.

Jesperson et al., Multi–Angle Compound Imaging, Ultrasonic Imaging 20, pp. 81–102, Dynamedia, Inc. 1998.

*Primary Examiner*—Marvin M. Lateef
*Assistant Examiner*—Maulin Patel
*Attorney, Agent, or Firm*—W. Brinton Yorks, Jr.

[57] ABSTRACT

An adaptive ultrasonic spatial compounding method is described in which the number of component ultrasonic images which are to be spatially compounded is varied in response to the type of scanning procedure. In a survey mode, when the transducer is rapidly scanning a patient and there is a low degree of correlation from frame to frame, the number of component ultrasonic images which are compounded is reduced. In a study mode, when the transducer is held relatively stationary to study a particular region of the body and the frame-to-frame spatial correspondence is relatively high, the number of component images is increased.

28 Claims, 6 Drawing Sheets

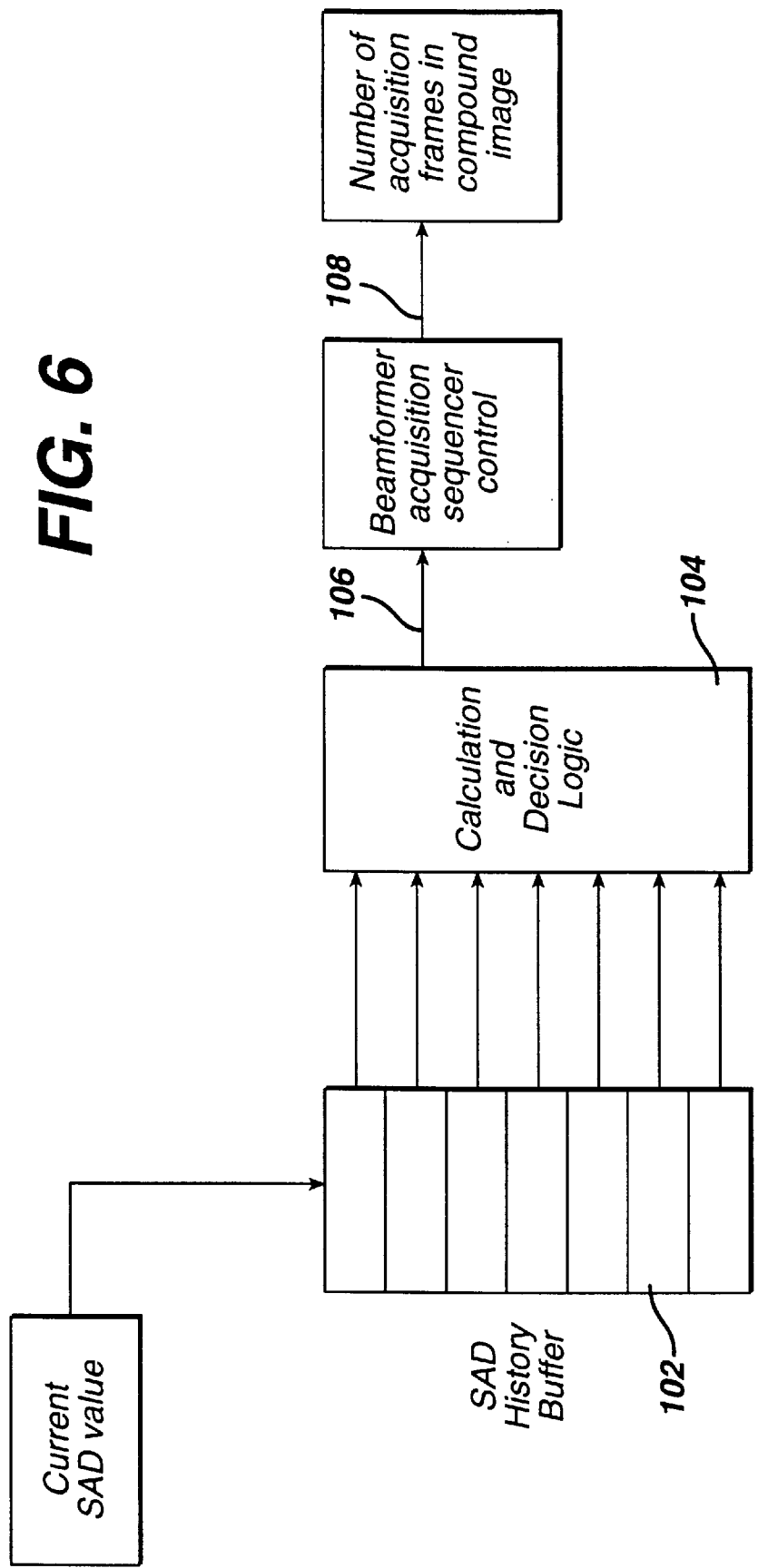

ULTRASONIC DIAGNOSTIC IMAGING SYSTEM WITH ADAPTIVE SPATIAL COMPOUNDING

This application claims the benefit of Provisional U.S. Patent Application Ser. No. 60/102,923, filed Oct. 1, 1998.

This invention relates to ultrasonic diagnostic imaging systems and, in particular, to ultrasonic diagnostic imaging systems that produce adaptive spatially compounded images which reduces image blurring.

Spatial compounding is an imaging technique in which a number of ultrasound images of a given target that have been obtained from multiple vantage points or angles are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component image frames from substantially independent spatial directions, utilizing an array transducer to implement electronic beam steering and/or electronic translation of the component frames. The component frames are combined into a compound image by summation, averaging, peak detection, or other combinational means.

The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged. Several criteria can be used to determine the degree of independence of the component frames (see, e.g., O'Donnell et al. in IEEE Trans. UFFC v.35, no.4, pp 470–76 (1988)). In practice, for spatial compound imaging with a steered linear array, this implies a minimum steering angle between component frames. This minimum angle is typically on the order of several degrees.

The second way that spatial compound scanning improves image quality is by improving the acquisition of specular interfaces. For example, a curved bone-soft tissue interface produces a strong echo when the ultrasound beam is exactly perpendicular to the interface, and a very weak echo when the beam is only a few degrees off perpendicular. These interfaces are often curved, and with conventional scanning only a small portion of the interface is visible. Spatial compound scanning acquires views of the interface from many different angles, making the curved interface visible and continuous over a larger field of view.

Greater angular diversity generally improves the continuity of specular targets.

However, the angular diversity available is limited by the acceptance angle of the transducer array elements. The acceptance angle depends on the transducer array element pitch, frequency, and construction methods.

One of the problems associated with real time spatial compound imaging is that several image acquisitions are needed to produce each new compound image frame. The time needed to acquire a spatial compound image consisting of N component frames is approximately N times longer than that of each individual component frame. It is generally desirable to acquire a large number of component frames to maximize the image quality of the compound image. However, since the images to be compounded are acquired temporally, the compounding of the images can produce a blurred resultant image. A particular instance of blurring arises when intentional scanning motion of the scanhead by the clinical operator causes misregistration between the component frames. When the clinical operator is searching for abnormalities in a survey mode the scanhead is typically moved fairly quickly in order to view as much tissue as possible in a short time. The result of scanhead motion is that temporally sequential component frames become increasingly misregistered and decorrelated. As the clinical operator identifies potential abnormalities, the scanning motion is slowed down or stopped completely to image the features of interest ("targeted" or "study" mode). At this point, the image features within the component frames of the compound image are more highly correlated, and motion blurring in the compound image is substantially reduced or completely eliminated as long as the scanhead is substantially stationary. It is desirable for image blurring during real time spatial compound imaging to be an inconsequential factor when operating in either mode or when switching between the two modes.

In accordance with the principles of the present invention, blurring of a compound image is reduced and image quality improved by adapting the number of component frames used to form a spatially compound image to the mode of operation. During the survey mode, when scanhead motion is relatively high, only a few component images are used to form a compound image. During the study mode, when scanhead motion is relatively low, a greater number of component images can be used to form a compound image without blurring. The change in the number of component frames used can be switched with the setting of the mode of operation by the user or, in the preferred embodiment, the ultrasound system automatically senses the motion of the scanhead and adaptively adjusts the number of images being compounded accordingly.

In the drawings:

FIG. 6 illustrates the use of a SAD-calculated image misregistration factor to adaptively adjust the number of component frames used to form a spatially compounded image.

Figure 1:
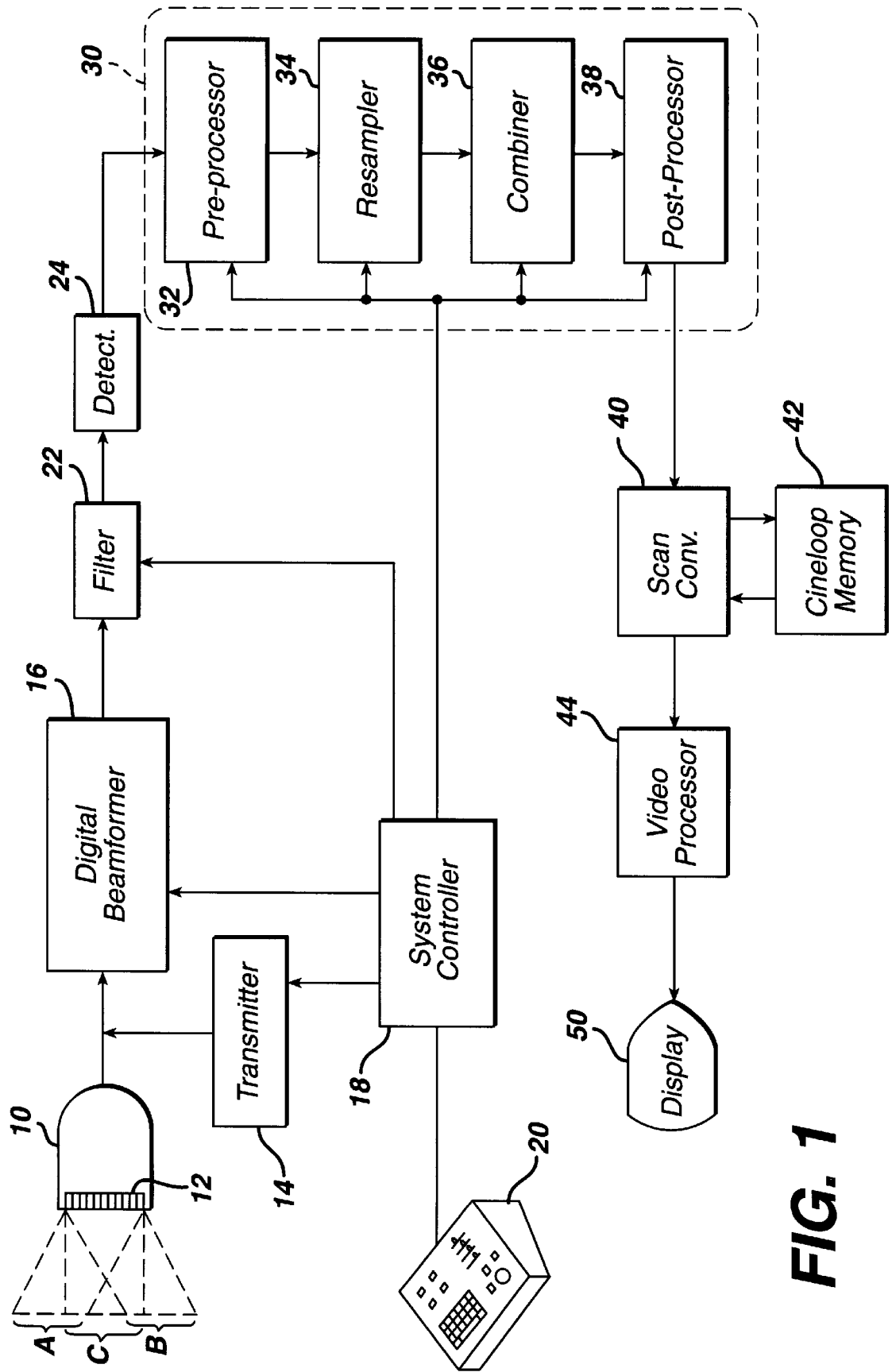
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is shown. A scanhead 10 including an array transducer 12 transmits beams at different angles over an image field denoted by the dashed rectangle and parallelograms. Three groups of scanlines are indicated in the drawing, labeled A, B, and C with each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined angle.

The echoes returned from along each scanline are received by the elements of the array, digitized as by analog to digital conversion, and coupled to a digital beamformer 16. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls on a user interface 20 operated by the user of the ultrasound system. The system controller controls the transmitter to transmit the desired number of scanline groups at the desired angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame or to the pixels of the display space.

After resampling the image frames are compounded by a combiner 36. Combining may comprise summation, averaging, peak detection, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop® memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924. Following scan conversion the spatially compounded images are processed for display by a video processor 44 and displayed on an image display 50.

Figure 2:
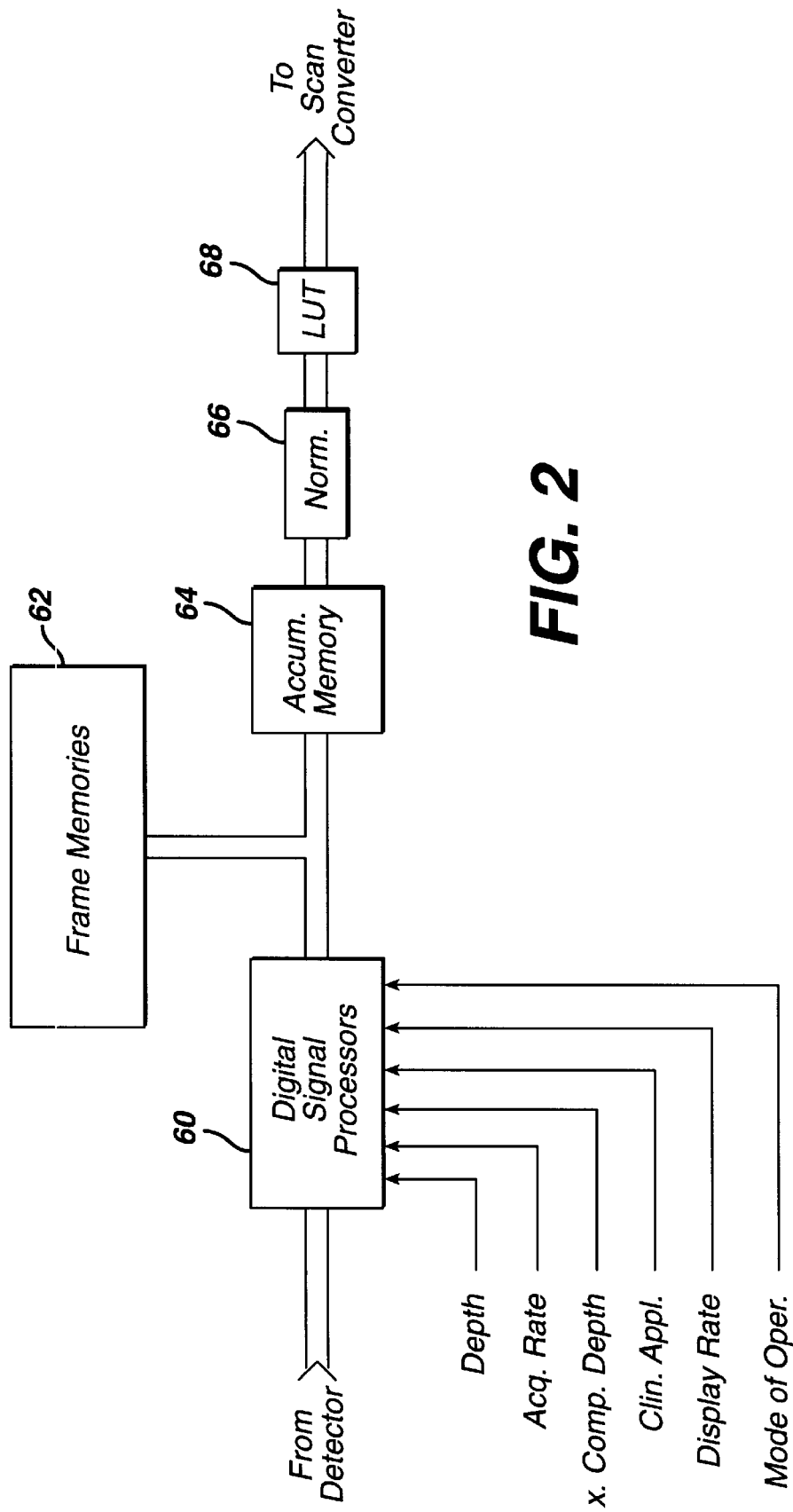
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. In accordance with the principles of the present invention, the digital signal processors are responsive to control parameters including image display depth, depth of region of greatest compounding, clinical application, compound display rate, mode of operation, and acquisition rate for determining the number of images to compound at a given instant in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

Figure 3:
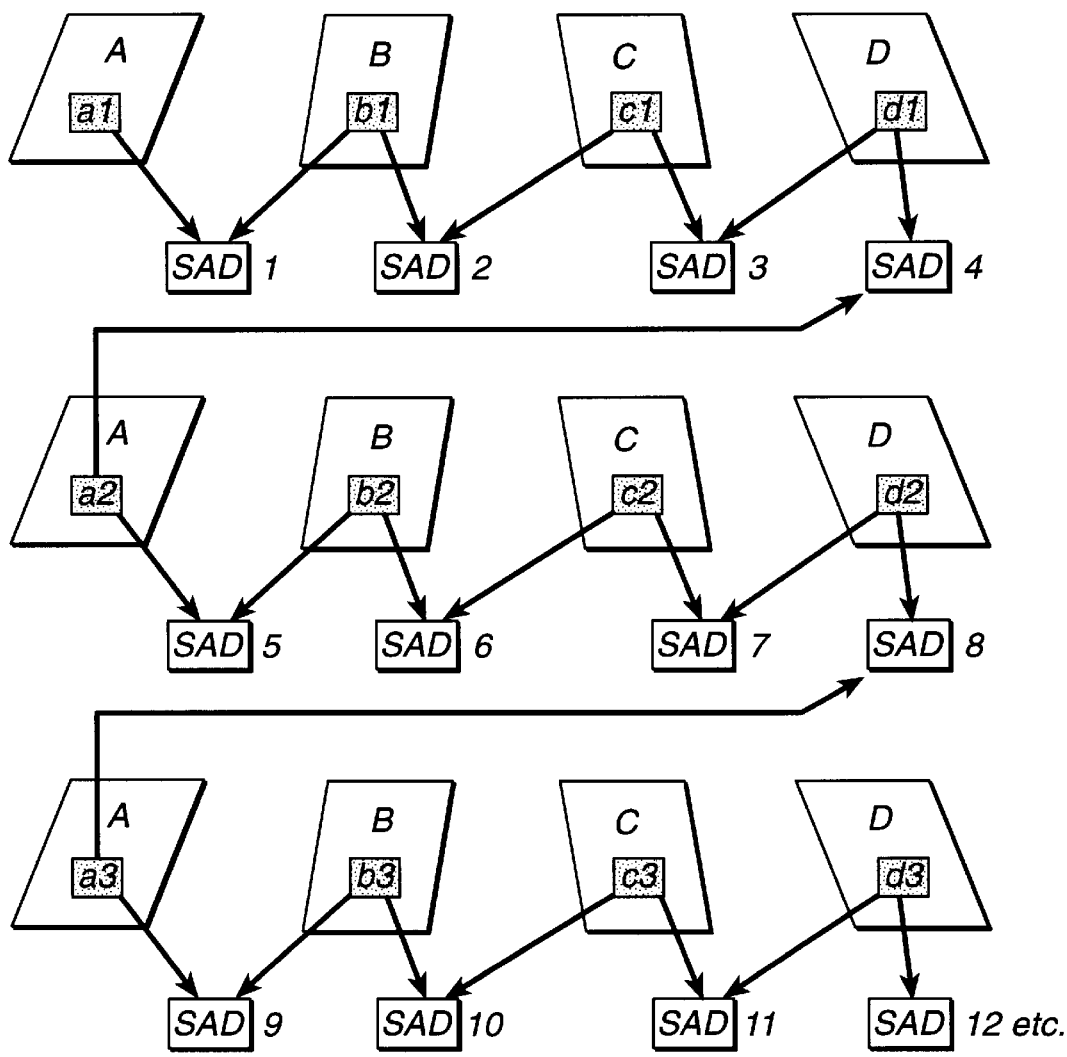
FIG. 3 illustrates the computation of the degree of misregistration of constituent image frames used to form a compound image.

Misregistration between component frames can be measured by a number of motion tracking methods such as correlation block search (U.S. Pat. No. 5,782,766), Doppler tissue velocity (U.S. Pat. No. 5,127,409), accelerometers or other motion sensors (U.S. Pat. No. 5,529,070) and feature tracking. However, these methods generally require large amounts of computation. The effect of misregistration can be detected more simply, without explicit measurement of the motion, by comparing the similarity or difference of one component frame with a subsequent frame in the temporal sequence. Similarity or difference metrics such as cross correlation, or sum of absolute differences (SAD), generally require less computation than motion estimation, and can be used to quantify frame-to-frame similarity or difference in at least one region of interest (ROI) within the frame. For example, the sum of absolute differences (SAD) can be easily calculated for the ROIs a1, b1, c1, etc. shown in FIG. 3. In the embodiment of FIG. 3 the SAD is computed for the ROIs of temporally adjacent images A, B, C, etc. in the following sequence: SAD (a1–b1), SAD (b1–c1), SAD (c1–d1), SAD (d1–a2), SAD (a2–b2), etc. Each row of component image frames in FIG. 3 represents the four images that are combined to form a different compound image. At the end of each row it is seen that a SAD calculation is performed between the last component image of one compound image and the first component image of the next compound image.

If the sum of absolute differences is zero or very small, then little or no misregistration has occurred between frames. Conversely, if the SAD is large, then the misregistration is significant. Therefore, the temporal sequence of the SAD values between corresponding frames in subsequent compound images gives a running indication of the amount of misregistration due to scanhead motion, and can be used to change the compounding process accordingly.

Figure 4:
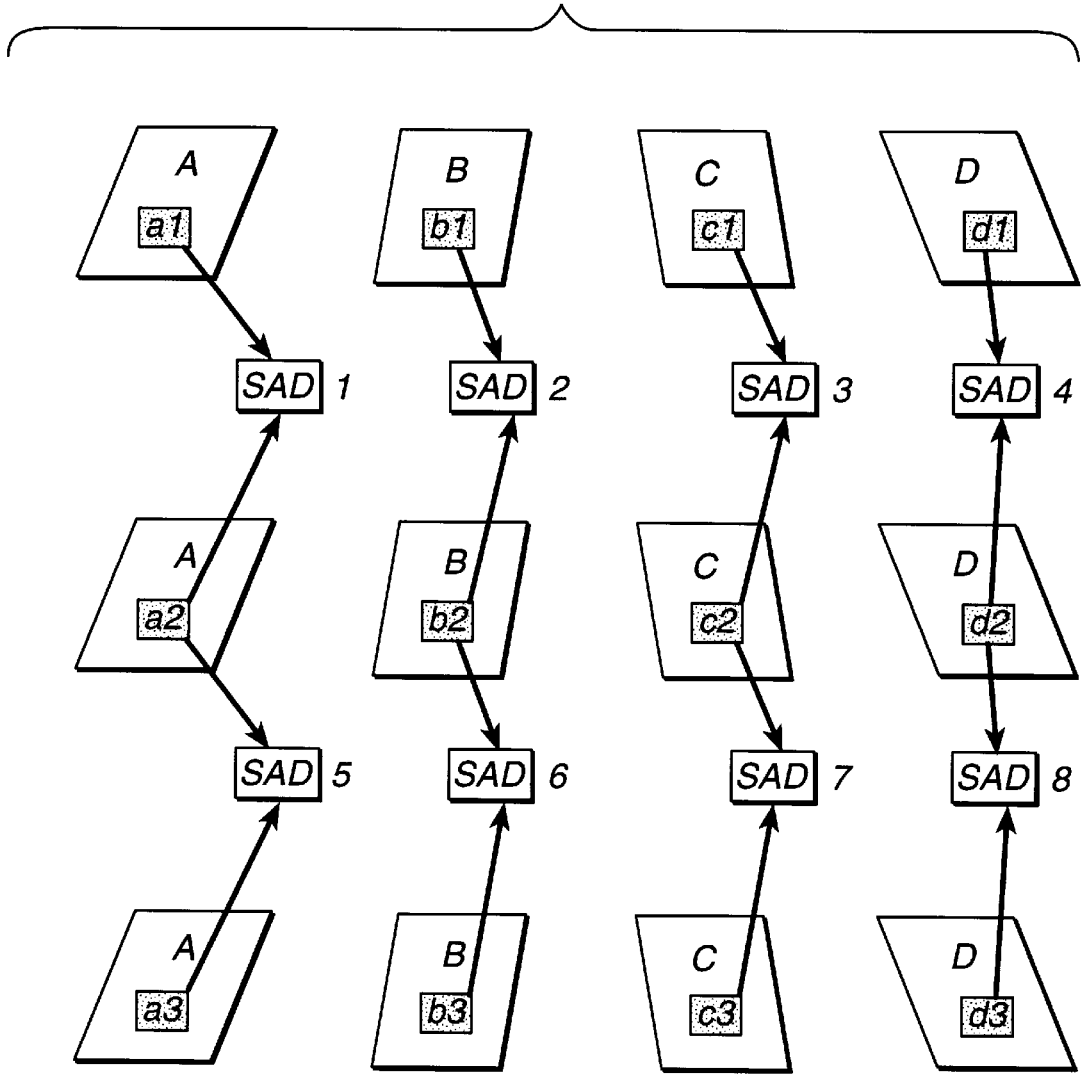
FIG. 4 illustrates the computation of the degree of misregistration of constituent image frames by comparing constituent image frames with the same steering angle of different compound images.

This straightforward sequence of calculating differences may not be optimum, because scanning from different angles in and of itself causes some frame-to-frame decorrelation. Such frame to frame fluctuations may require the use of temporal averaging and can slow down the switching response time between survey and study modes. The decorrelation due to scanhead and tissue motion alone can be better isolated by calculating the differences between ROIs in component frames with the same steering angle in subsequent compound images, as shown in FIG. 4. In this embodiment the SADs are calculated in the following sequence: SAD (a1–a2), SAD (b1–b2), SAD (c1–c2), SAD (d1–d2), SAD (a2–a3), SAD (b2–b3), SAD (c2–c3), SAD (d2–d3), etc. This approach incurs an N frame propagation delay for the calculation of the SAD value, but better isolates misregistration due to scanhead or tissue motion. The mode switching response time of this processing will be asymmetrical, depending upon whether one is switching from a greater number of component frames to a lesser number, or the reverse. It will take less time to adapt from survey mode (few component frames per compound image) to study mode (more component frames per compound image) than the reverse, because the compounded frame rate is higher in the survey mode. This may not provide the optimum response characteristic, because when the scanhead is moved, the operator would like to see a rapid adaptation back to survey mode.

Motion need not be detected by comparing individual component frames. Motion can also be detected by comparing the information of compounded images.

Figure 5:
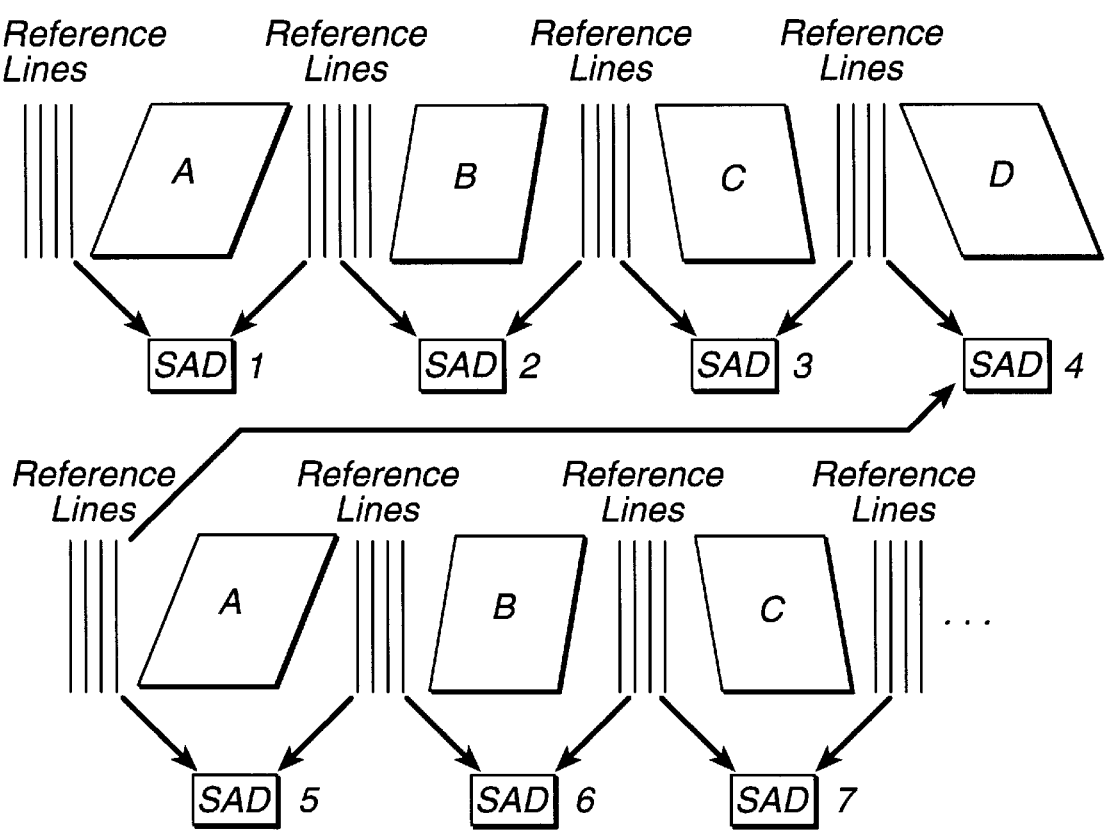
FIG. 5 illustrates the use of reference lines for calculating image misregistration.

A third embodiment for sensing misregistration, shown in FIG. 5, is to acquire a small number of "calibration" lines interspersed between each component image frame. The ROI defined by these calibration lines is preferably viewed from a constant look direction (thus overcoming the limitation of the FIG. 3 embodiment) and be used for misregistration sensing using SAD or other algorithms. As FIG. 5 shows, the calibration or reference lines acquired between component image frames are used to compute SAD or otherwise to measure the degree of misregistration that has occurred during the time required to acquire a component image. The calibration lines need not be at a regular line density or at a constant angle, but may be widely spaced, differently angled, and/or scattered across the image plane. A sparsely sampled frame will perform admirably. Although the additional lines will lower the overall frame rate, the temporal degradation need not be very great due to the low number of reference lines and, in any case, an adaptive approach can still give the user the perception of a satisfactorily high frame rate.

Given that SAD or other difference measures can accurately indicate the degree of scanhead or tissue motion blurring, this information can be used to automatically switch from "survey mode" to "study or targeted mode" by adapting the number of component frames used to form the compound image. For example, in survey mode, the number of frames must be small (e.g. N=3 to 5) in order to prevent motion blurring during rapid scanhead motion by the operator. In some cases it may be desirable that there be no compounding at all during the survey mode. During "targeted mode" the number of frames compounded can be greater (e.g., 7 to 11), since the scanhead motion is limited by the need to keep the scanhead focused on a lesion or structure of interest. FIG. 6 shows a means by which the SAD values can be used to determine when the scanhead is being moved rapidly, and thereby automatically switch into the survey mode with fewer frames in the acquisition sequence. Each time a new SAD metric is calculated, it is stored in a SAD history buffer 102, which retains recently calculated SAD values. When the SAD value drops below a given threshold for a prescribed number of frames, which levels may be preset or set by the user, the calculation and decision logic 104 recognizes the new condition of improved image registration and automatically switches to the targeted or study mode with a larger number of frames in the sequence. When changing to the study mode a new control signal 106 is sent to the beamformer acquisition sequencer controller of the system controller 18 to acquire a greater number of spatially overlapping images, and a new control signal 108 is sent to the spatial compounding processor 30 to command that a greater number of component images be used to form each spatially compounded image. For example, the control signals could command a change from compounding three images with steering angles of −30°, 0°, +30° to compounding five images with steering angles of −30°, −15°, 0°, +15°, +30°. Clearly other decision and control stratagems with a more continuous control scheme (i.e.: where there would be more than 2 states) are possible. For example, a progressive decrease in the SAD value could result in a progressive increase in the number of component frames being compounded, and a progressive decrease in the number of component frames as the SAD value trends higher, including the cessation of compounding completely at the highest SAD value. One could also use this method to adapt steering angles, scan line density, number of focal zones, the pulse repetition frequency (PRF), dead time between transmissions, size of the region of interest, and other factors which affect acquisition frame rate in addition to the number of component frames per compounded frame, depending on the clinical situation.

An alternative technique for varying the number of component frames per compounded image is to use an IIR (infinite impulse response) filter to combine the component frames. The filter time constant, that is, the image data in the feedback path, is controlled as a function of motion.

The user can be given a choice of operating the ultrasound system in the survey or study mode, and his or her mode choice will result in the determination of the number of component frames to be compounded. However the adaptive approach is preferred for its ability to automatically and continually optimize the spatial compounding process in response to changes in scanhead manipulation without the need for user intervention.

What is claimed is:

1. A method for adaptively adjusting spatial compounding to the mode of ultrasonic scanning comprising the steps of:

acquiring temporally different ultrasonic diagnostic image information;

processing said image information to produce a measure of scanhead motion; and adjusting an operating parameter of a spatial compounding processor in response to said measure;

wherein said temporally different ultrasonic diagnostic image information comprises component frames of a compound image; and wherein said step of processing comprises calculating a metric representing the similarity or difference between component frames.

2. The method of claim 1, wherein said operating parameter is the number of component images used to form a compound image.

3. The method of claim 2, wherein said operating parameter results in the use of a relatively few component images to form a compound image when scanhead motion is relatively high, and a relatively greater number of component images to form a compound image when scanhead motion is relatively low.

4. The method of claim 1, wherein said temporally different ultrasonic diagnostic image information comprises component frames of a compound image; and wherein said step of processing comprises calculating a metric representing the similarity or difference between component frames.

5. The method of claim 4, wherein said metric comprises a sum of absolute differences computation of temporally different image data.

6. The method of claim 4, wherein said step of calculating comprises calculating said metric for temporally adjacent component frames.

7. The method of claim 6, wherein one of said temporally adjacent component frames is a component image of a first compound image, and wherein the other of said temporally adjacent component frames is a component frame of a second compound image.

8. The method of claim 4, wherein said step of calculating comprises calculating said metric for temporally nonadjacent component frames.

9. The method of claim 8, wherein said step of calculating comprises calculating said metric for component frames having corresponding look directions.

10. The method of claim 1, wherein said temporally different ultrasonic diagnostic image information comprises component frames of a compound image; and further comprising the step of:

acquiring reference image data on a time interleaved basis with said component frames, wherein said reference image data is processed to produce said measure of scanhead motion.

11. The method of claim 10, wherein said reference image data comprises reference lines which exhibit a corresponding spatial alignment.

12. The method of claim 1, wherein said operating parameter is the look directions of the component images used to form a compound image.

13. The method of claim 1, wherein said operating parameter is the steering angle of the component images used to form a compound image.

14. The method of claim 1, wherein said operating parameter is the scan line density of the component images used to form a compound image.

15. The method of claim 1, wherein said operating parameter is the number of focal zones of the component images used to form a compound image.

16. The method of claim 1, wherein said operating parameter is the PRF of the component images used to form a compound image.

17. The method of claim 1, wherein said operating parameter is the steering angle of the component images used to form a compound image.

18. The method of claim 1, wherein said operating parameter is the acquisition rate of the component images used to form a compound image.

19. The method of claim 1, wherein said operating parameter is the display rate of the compound image.

20. The method of claim 1, wherein said operating parameter controls a temporal operating characteristic of said spatial compounding processor.

21. The method of claim 20, wherein said temporal operating characteristic is the time during which component images for spatial compounding are acquired.

22. The method of claim 20, wherein said spatial compounding processor includes an IIR filter; and wherein said temporal operating characteristic is the time constant of said IIR filter.

23. A method for adaptively adjusting spatial compounding to the mode of ultrasonic scanning comprising the steps of:

acquiring temporally different ultrasonic diagnostic image information;

processing said image information to produce a measure of scanhead motion; and adjusting an operating parameter of a spatial compounding processor in response to said measure;

wherein said step of processing comprises calculating a metric representing the similarity or difference between component image frames.

24. The method of claim 23, wherein said step of calculating a metric calculates said metric on the basis of a region of interest in image frames used for spatial compounding.

25. The method of claim 23, wherein said step of calculating a metric calculates said metric for temporally adjacent image frames.

26. The method of claim 25, wherein one of said temporally adjacent image frames is a component image frame of a first compound image, and wherein the other of said temporally adjacent image frames is a component image frame of a second compound image.

27. The method of claim 23, wherein said step of calculating a metric calculates said metric for temporally nonadjacent image frames.

28. The method of claim 23, wherein said step of calculating a metric calculates said metric for image frames having corresponding look directions.

* * * * *